(12) United States Patent
Bengtsson (10) Patent No.: US 12,168,894 B2
(45) Date of Patent: Dec. 17, 2024

(54) LATCH ASSEMBLY FOR A HOOD OF A VEHICLE, A HOOD ELEVATION SYSTEM AND A METHOD FOR MANUFACTURING A LATCH ASSEMBLY

(71) Applicant: Volvo Car Corporation, Gothenburg (SE)

(72) Inventor: Per-Johan Bengtsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/114,526

(22) Filed: Feb. 27, 2023

(65) Prior Publication Data

US 2023/0313569 A1 Oct. 5, 2023

(30) Foreign Application Priority Data

Mar. 31, 2022 (EP) .................................... 22165967

(51) Int. Cl.
 *E05B 77/08* (2014.01)
 *B60R 21/38* (2011.01)
 *E05B 17/00* (2006.01)

(52) U.S. Cl.
 CPC .............. *E05B 77/08* (2013.01); *B60R 21/38* (2013.01); *E05B 17/0062* (2013.01)

(58) Field of Classification Search
 CPC .... E05B 77/08; E05B 17/0062; E05B 15/022; E05B 85/04; B60R 21/38; E05Y 2900/536
 See application file for complete search history.

(56) References Cited

U.S. PATENT DOCUMENTS 7,854,289 B2 * 12/2010 Gust ....................... E05D 3/145
 180/69.1
2009/0160201 A1 * 6/2009 Dold .................. E05B 15/0295
 292/341.15

(Continued)

FOREIGN PATENT DOCUMENTS

DE 102015118404 A1 5/2016

OTHER PUBLICATIONS

Aug. 22, 2022 European Search Report issued in corresponding EP Application No. 22165967.

*Primary Examiner* — Paul N Dickson
*Assistant Examiner* — Shams Dhanani
(74) *Attorney, Agent, or Firm* — Clements Bernard Walker; Christopher L. Bernard (57) ABSTRACT

A latch assembly for a hood of a vehicle including a first plate including an elongated slot extending in a horizontal direction (H), a second plate, a first member being mechanically connected to the second plate, the first member extending in a vertical direction (V) through the elongated slot, slidably connecting the first plate to the second plate, at least one deformable element, in a retracted position of the latch assembly, securing the first plate to the second plate in the horizontal direction (H), and the at least one deformable element being arranged to deform upon impact in the horizontal direction (H) allowing the first plate to slide relative to the second plate in the horizontal direction (H) to an extended position. The present disclosure further relates to a hood elevation system for a vehicle and a method for manufacturing a latch assembly for a hood of a vehicle.

15 Claims, 5 Drawing Sheets

(56) References Cited

U.S. PATENT DOCUMENTS

| | | | | |
|---|---|---|---|---|
| 2013/0087401 A1* | 4/2013 | Masih | B60R 21/38 |
| | | | 180/274 |
| 2014/0182962 A1* | 7/2014 | Mcintyre, I | B60R 21/38 |
| | | | 180/274 |
| 2015/0107929 A1* | 4/2015 | Kugler | B60R 21/38 |
| | | | 180/274 |
| 2016/0046259 A1* | 2/2016 | Jayasuriya | B60R 21/0134 |
| | | | 180/274 |
| 2016/0129950 A1* | 5/2016 | Krajenke | E05C 1/004 |
| | | | 292/137 |
| 2018/0079385 A1* | 3/2018 | Henck | E05B 77/08 |
| 2018/0313123 A1* | 11/2018 | Kenyon | E05D 11/087 |
| 2020/0164831 A1* | 5/2020 | Wood | E05D 3/145 |
| 2021/0301565 A1 | 9/2021 | Sasaki et al. |
| 2022/0228404 A1* | 7/2022 | Klein | E05B 77/08 |
| 2022/0316246 A1* | 10/2022 | Suetsugu | B60R 21/38 |
| 2024/0010161 A1* | 1/2024 | Kim | B62D 25/12 |

* cited by examiner

LATCH ASSEMBLY FOR A HOOD OF A VEHICLE, A HOOD ELEVATION SYSTEM AND A METHOD FOR MANUFACTURING A LATCH ASSEMBLY

CROSS-REFERENCE TO RELATED APPLICATION

The present disclosure claims the benefit of priority of co-pending European Patent Application No. 22 165 967.5, filed on Mar. 21, 2022, and entitled "LATCH ASSEMBLY FOR A HOOD OF A VEHICLE, A HOOD ELEVATION SYSTEM AND A METHOD FOR MANUFACTURING A LATCH ASSEMBLY," the contents of which are incorporated in full by reference herein.

TECHNICAL FIELD

The present disclosure relates to a latch assembly for a hood of a vehicle, a hood elevation system for a vehicle, a vehicle including such a hood elevation system, and a method for deploying such a hood elevation system.

BACKGROUND

Protection of vulnerable road users, e.g. pedestrians, bicyclists, motorcyclists and the like, may require an active hood system. Such systems are designed to attempt to decrease the consequences of injuries in the event of a collision between a vulnerable road user and the hood of a vehicle. Generally, these systems should allow the pedestrian to be slowed down gradually and as much as possible, by allowing the hood to deform. As the space between the hood and the components underneath the hood is limited, hood elevation systems, which raise the hood in the event of a collision with a vulnerable road user, have been developed.

Fundamental to the hood elevation system is a latch assembly, which functions to keep the hood in place unless a collision with a vulnerable road user occurs. These latch assemblies are configured to be deployable, i.e. they extend or move in a direction. Current deployable latch assemblies are typically not very compact and can be unreliable in certain collision situations.

Based on the above, there is a need to provide an improved latch assembly for a hood of vehicle. More specifically, there is a need for improved latch assemblies that are more compact and/or robust.

SUMMARY

It is therefore an object of the present disclosure to provide a latch assembly, a hood elevation system, a vehicle including the hood elevation system and a method for deploying such a hood elevation system to mitigate, alleviate or eliminate the above-identified deficiencies and disadvantages.

The present disclosure relates to a latch assembly for a hood of a vehicle. The latch assembly includes a first plate including an elongated slot extending in a horizontal direction, a second plate and a first member being mechanically connected to the second plate. The first member extends in a vertical direction through the elongated slot, slidably connecting the first plate to the second plate. The latch assembly further includes at least one deformable element, in a retracted position of the latch assembly, secures the first plate to the second plate in the horizontal direction. Further, the at least one deformable element is arranged to deform/break upon impact in the horizontal direction, allowing the first plate being to slide relative to the second plate in the horizontal direction to an extended position.

An advantage of the latch assembly according to the present disclosure is that the first plate and the second plate being slidably connected through the first member results in a compact design which takes up minimal space within the hood of the vehicle when the latch assembly is in its retracted position. Once extended to the extended position, the latch assembly allows a hood for a vehicle to have an increased deformation zone, also known as a crash zone, a crumble zone, a crush zone, due to the increased distance between the vehicle hood and the rest of the vehicle.

The horizontal direction should not necessarily be viewed as the travelling direction of a vehicle, but rather the direction in which the first plate of the latch assembly being able to slide in relation to the second plate. The vertical direction could be viewed as the extension direction of the first member. The vertical direction is substantially orthogonal to the horizontal direction. Additionally, an impact in the horizontal direction is not limited to an external force solely acting in the horizontal direction. It merely denotes that the component deforms upon the impact of the horizontal component of this force. The component of the impact force that deforms the at least one deformable element in the horizontal direction may be 50N to 500N, preferably 300N, or in some aspects greater than 500N, for example 1000N. Thus, if there is only one deformable element it may be arranged to withstand impact forces between 50N to 500N. If there is more than one deformable element, the force will be evenly distributed amongst each deformable element. The deformable element is not arranged to deform upon e.g. a vertical force component and does not secure the first plate and the second plate to each other in the vertical direction. Finally, that the first plate is allowed to slide relative to the second plate merely denotes a relative movement between the first plate and the second plate. In other words, the phrase also encompasses that the second plate is allowed to slide relative to the first plate.

Further, the latch assembly may include a second member being mechanically connected to the second plate. The first member may be located at a first portion of the second plate and the second member may extend in a vertical direction and being located at a second portion of the second plate. The latch assembly may further include a rod extending in the horizontal direction from the first member to the second member. The rod may be slidably connectable to a hood latch of a vehicle.

As the rod extends in the horizontal direction from the first member to the second member, increased robustness of the latch assembly is achieved. As the rod is slidably connected to the hood latch of a vehicle, the sliding motion of the latch assembly with respect to the hood latch is limited by the horizontal distance between the first member and the second member. This achieves a controlled sliding motion of the latch assembly relative to the hood latch. The rod may be called a striker or a striker rod. Additionally, the location of the first portion and the second portion of the second plate determines the horizontal distance between the first member and the second member.

Further, when the latch assembly is in a retracted position, the first member may extend through a first region of the elongated slot and in the extended position, the first member may extend through a second region of the elongated slot. In other words, upon deformation of the at least one deformable element by horizontal impact, the first member may be allowed to slide to a second portion of the elongated slot.

Accordingly, the sliding motion of the first plate relative to the second plate is limited by the length of the elongated slot. In other words, the first member may slide within the elongated slot, and as the first member is mechanically connected to the second plate, the first plate slides relative to the second plate. This achieves improved control of the sliding motion in the horizontal direction of the first plate relative to the second plate.

Further, the first member and second member may include adjustment screws configured to adjust the position of the rod in the vertical direction relative to the second plate. Accordingly, one may choose an appropriate position of the rod in the vertical direction relative to the second plate, for example depending on features of the hood latch, the hood, or other parts of the vehicle.

Further, the first plate may be parallel to the second plate. An advantage of this is any the sliding motion of the first plate relative to the second plate in occurs in a single direction, which achieves a less complex sliding movement of the first plate and the second plate in the latch assembly.

Further, the second plate may include at least one securing slot, the at least one deformable element may be located in the at least one securing slot. An advantage of this is that a simple arrangement for keeping the at least one deformable element secured before horizontal impact is achieved. Accordingly, the at least one securing slot may be any slot where the at least one deformable element is located. The slot may have an extension in the horizonal direction, similar to the elongated slot of the first plate, but functionally differs in that it is arranged to lock the at least one deformable element in the horizontal direction.

Yet further, the at least one securing slot may include protrusions configured to, in the retracted position, lock the at least one deformable element in the horizontal direction. An advantage of this is a further simplified and reliable arrangement to lock the at least one deformable element in the horizontal direction. The protrusions may for example be teeth shaped to avoid any unwanted horizontal movement of the at least one deformable element within the securing slot.

Even yet further, the protrusions may be located at a first end of the at least one securing slot. Accordingly, after deformation of the at least one deformable element, the securing slot is allowed to slide relative to the deformed at least one deformable element in the horizontal direction. Consequently, the sliding movement of the first plate in relation to the second plate may also be allowed.

Further, the latch assembly may include a friction decreasing unit. The friction decreasing unit may be made out of or may be coated with anon-metallic material, e.g., plastic. Other plates, such as the first plate and the second plate may be made out of metal. An advantage of this is that the friction decreasing unit may be used to separate metallic plates or parts from direct contact with one another, such as the first plate and the second plate. Additionally, metallic plates or parts in direct contact increases corrosion risks and/or dirt getting stuck between the plates which may result in increased friction between first plate and the second plate. As such, a friction decreasing unit improves the sliding motion of the first plate relative to the second plate.

Further, the at least one deformable element may include a plastic bushing. Plastic bushings are inexpensive, and it is simple to construct a plastic bushing which deforms reliably at suitable impact forces. However, the at least one deformable element may include a screw, for example a metal screw, in particular an aluminum screw.

Further, the at least one deformable element may include an annular or collar part and a middle or central part. The middle part may be attached to the annular part and the annular part and the middle part may include a predetermined spacing or distance therebetween for controlling the impact force needed to deform the at least one deformable element. An advantage of this is that due to the predetermined spacing between the annular part and the middle part, the force at which the bushing will deform can easily be configured. In this example, the annular part may be a ring of material extending around the middle part, which may be of a cylinder shape. However, other shapes may be used as long as there is a predetermined spacing between the parts.

Moreover, a hood elevation system for a vehicle is disclosed. The hood elevation system includes a hood latch, and a latch assembly according to any of the previous aspects of the disclosure. The latch assembly is slidably connected to the hood latch. Further, the hood elevation system includes an actuator being configured to move the latch assembly relative to the hood latch upon a collision of the vehicle with a vulnerable road user, and upon actuation of the actuator, the latch assembly linearly moves in its retracted position away from the hood latch. The at least one deformable element is arranged to deform upon the latch assembly reaching a stop position in which the latch assembly is prevented from further linear movement away from the hood latch, allowing the first plate to slide relative to the second plate in the horizontal direction to an extended position.

The vulnerable road user is an umbrella term for road users such as pedestrians, bicyclists, motorcyclists, electric scooter users and animals. The latch assembly being slidably connected to the hood latch should be interpreted as the latch assembly being configured to slide in the hood latch under certain circumstances. Actuation of a suitable actuator, preferably a pyrotechnic actuator, gives rise to a force, which moves the latch assembly relative to the hood latch.

That the latch assembly linearly moves in its retracted position away from the hood latch should be viewed as that the first plate of the latch assembly has not been allowed to slide relative to the second plate. As such, the latch assembly is moving in its undeployed, retracted position before reaching the stop position. Secondly, the fact that the latch assembly moves away from the hood latch means merely that a distance between a part of the latch assembly and the hood latch is increased as the latch assembly starts to move. In other words, the movement is relative, and the term "move" may mean that the hood latch moves away from the latch assembly.

The stop position should be viewed as a position in which an impact of the latch assembly deforms the at least one deformable element. In this position, the latch assembly itself cannot move any further in relation to the hood latch despite still being affected by a force in the horizontal direction. Therefore, deformation of the at least one deformable element occurs which allows the first plate of the latch to slide relative to the second plate and therefore brings the entire latch assembly to an extended position. This achieves a hood elevation system which before actuation of the actuators takes up minimal space within the hood of the vehicle and after the actuation of the actuator and deformation of the at least one deformable element achieves a hood elevation to have an increased deformation zone.

Further, the latch assembly of the hood elevation system may include a second member being mechanically connected to the second plate. The first member may be located at a first region of the second plate and the second member may extend in a vertical direction and may be located at a second portion of the second plate. The latch assembly may further include a rod extending in the horizontal direction from the first member to the second member and the rod may be slidably connectable to the hood latch. The stop position of the hood elevation system may be reached upon horizontal impact of the second member and the hood latch.

An advantage of this is that an increased control of the sliding motion of the latch assembly in relation to the hood assembly is achieved. Upon actuation of the actuator, the rod may slide within the hood latch in horizontal direction. The rod may be called a striker or a striker rod. Consequently, the latch assembly will move in the horizontal direction. The first member and the second member limit the horizontal distance of which the rod can slide within the hood latch. Therefore, the latch assembly starts sliding within the hood latch through the rod from a point near the first member to the second member. Once the second member reaches the hood latch, the latch assembly cannot slide further and reaches the stop position. The resulting force of impact between the second member and the hood latch deforms the at least one deformable element, which allows the first plate of the latch assembly to slide relative to the second plate and the latch assembly to reach the extended position.

Moreover, a vehicle including the hood elevation system according to any previous aspects of the disclosure is provided.

Moreover, a method for manufacturing a latch assembly for a hood for a vehicle is provided. The method includes providing a first plate including an elongated slot extending in a horizontal direction, providing a second plate, mechanically connecting a first member to the second plate. The first member extends in a vertical direction through the elongated slot, slidably connecting the first plate to the second plate. Further, the method includes the step of providing at least one deformable element arranged to secure the first plate to the second plate in the horizontal direction, the at least one deformable element being arranged to deform upon impact in the horizontal direction.

It should be noted that the above examples may be combined with each other irrespective of the aspect involved.

These and other aspects of the present disclosure will become apparent from and elucidated with reference to the examples described hereinafter.

Examples of the disclosure will be described in the following with reference to the following drawings.

BRIEF DESCRIPTION OF THE DRAWINGS

In the following, the disclosure will be described in a non-limiting way and in more detail with reference to exemplary aspects illustrated in the enclosed drawings, in which.

The figures are merely schematic representations and serve only to illustrate examples of the present disclosure. Identical or equivalent elements are in principle provided with the same reference signs.

DETAILED DESCRIPTION

Figure 1:
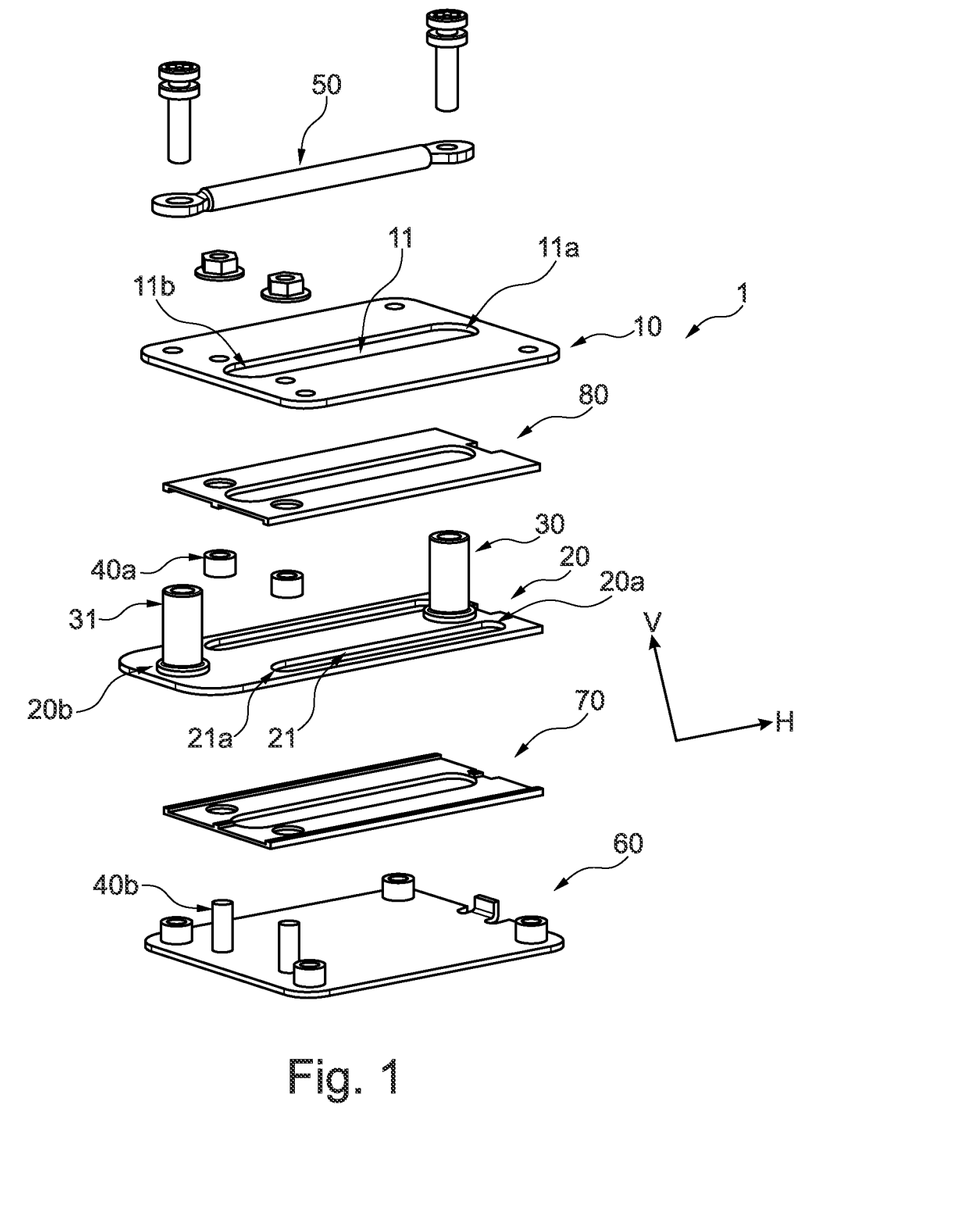
FIG. 1 illustrates an exploded view of a latch assembly for a hood of a vehicle.

FIG. 1 illustrates an exploded view of a latch assembly 1 for a hood of a vehicle. The latch assembly 1 includes a first plate 10 including an elongated slot 11 extending in a horizontal direction H. The elongated slot 11 may include a first region 11a and a second region 11b, situated close or at the ends of the elongated slot 11. The latch assembly 1 includes a second plate 20. The second plate 20 may include at least one securing slot 21. The securing slot 21 may include a first end 21a. A first member 30 is shown to be in mechanical connection with the second plate 20, for example by a socket or sleeve part of the first member 30 being integrated to the surface of the second plate 20. The second plate 20 shown here is located beneath the first plate 10 with respect to a vertical direction V, but other configurations may be possible.

As illustrated in FIG. 1, the first member 30 is mechanically connected to the second plate 20, for example by a socket directly integrated to the second plate 20. The first member 30 may additionally include an adjustment screw. A second member 31 may be in mechanical connection with the second plate 20 in a similar or different manner than the first member 30. The second member 31 may also include an adjustment screw. The latch assembly 1 includes at least one deformable element 40, which may include an annular member 40b and a middle member 40b. The at least one deformable element 40 may be located within the at least one securing slot 21 of the second plate 20 and may further be located at the first end 21a of the at least one securing slot 21. The deformable element or elements 40 may include a plastic bushing. As seen in FIG. 1, there may be two securing slots 21 and two deformable elements 40. However, the number of securing slots 21 and deformable elements 40 may vary based on the preferences of the skilled person.

As illustrated in FIG. 1, the latch assembly 1 may include a rod 50. The rod 50 may also be called a striker or a striker rod. The rod 50 may be slidably connected to the hood latch 2 (shown in FIGS. 5a-5c) of a vehicle. The rod 50 may extend from the first member 30 to the second member 31 in the horizontal direction. As illustrated in FIG. 1, the latch assembly may include a third plate 60. The third plate 60 functions as a base for the latch assembly 1, providing added durability to the latch assembly 1 and may include the middle part 40b of the at least one deformable element 40. The first plate 10, the second plate 20 and the third plate 60 are preferably be made of metal. Further, the latch assembly may include a friction decreasing unit 70, 80. As illustrated in FIG. 1, the friction decreasing unit 70, 80 may include a first friction decreasing plate 70 and a second friction decreasing plate 80. The plates may be arranged to sandwich the second plate 20. The friction decreasing unit 70, 80 may include or secure the at least one deformable element 40 in some aspects of the present disclosure. The friction decreasing unit 70, 80 is preferably made of plastic and may be arranged to avoid direct contact between metal parts of the latch assembly 1.

Figures 2A, 2B:
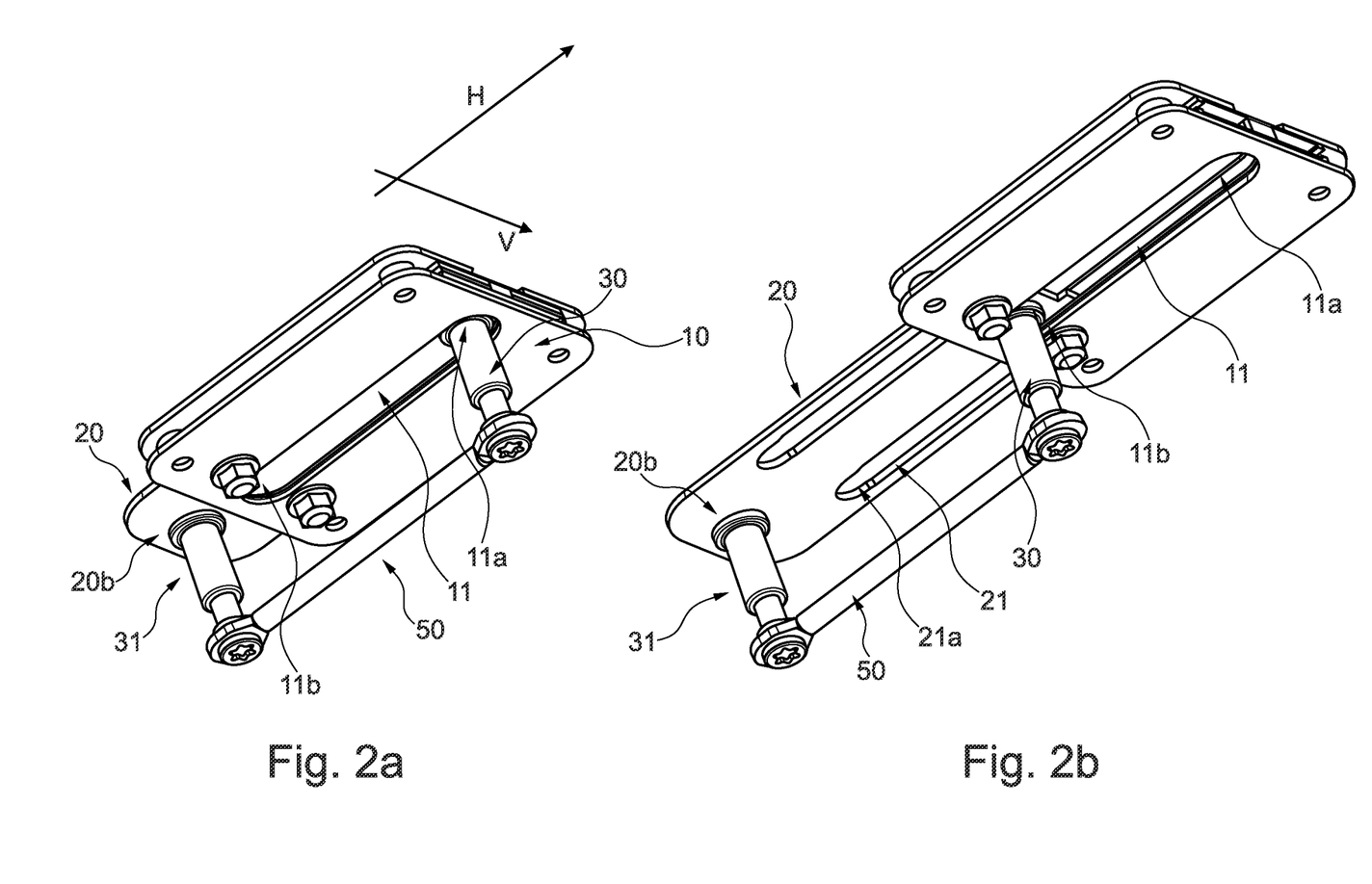
FIG. 2a illustrates a latch assembly in its retracted position.
FIG. 2b illustrates a latch assembly in its extended position.

FIG. 2a illustrates a latch assembly 1 in retracted position. As illustrated, in the retracted position, the first plate 10 is secured to the second plate 20 in the horizontal direction by the at least one deformable element 40 (shown in e.g. FIG. 1).

FIG. 2b illustrates a latch assembly in its extended position. As illustrated, the extended position is being reached as the first plate 10 is allowed to slide relative to the second plate 20 after deforming of the at least one deformable element 40 (shown in e.g. FIG. 1). As the first member 30 is extending in a vertical direction V through the elongated slot 11, the first plate 10 and the second plate 20 becomes slidably connected. The first member 30 may be allowed to slide from a first region 11a to second region 11b of the elongated slot 11 upon deformation of the at least one deformable element 40. As shown in FIGS. 2a and 2b, the offset between the first plate 10 and the second plate 20 in the horizontal direction H is increased in the extended position compared to the retracted position.

Figure 3A:
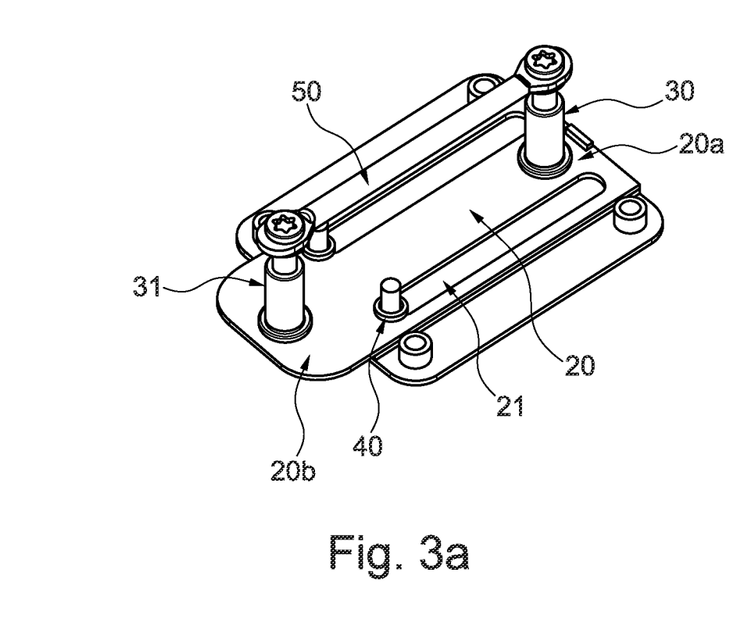
FIG. 3a illustrates a latch assembly in its retracted position in a view without the first plate.

FIG. 3a illustrates a latch assembly 1 in its retracted position where the first plate 10 is absent for illustrative purposes. The deformable element 40 may be located in the in the securing slot 21. A plurality of securing slots 21 and deformable elements 40 may be used. In the retracted position, the deformable element 40 prevents any horizontal sliding motion between the first plate 10 and the second plate 20. The deformable element may further be located in a first end 21a of the securing slot 21.

Figure 3B:
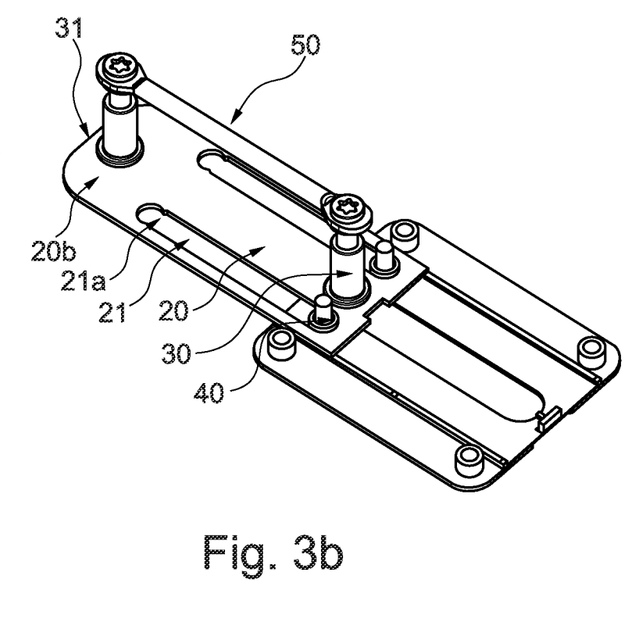
FIG. 3b illustrates a latch assembly in its extended position in a view without the first plate.

FIG. 3b illustrates a latch assembly 1 in its extended position where the first plate 10 is absent for illustrative purposes. As illustrated, the deformable element 40 is now deformed allowing the first plate 10 to slide relative to the second plate 20. The extend position can therefore be reached. If the deformable element 40 is located in the securing slot 21, then deformable element 21 may no longer be limited to be located in the first end 21a of the securing slot 21.

Figure 4:
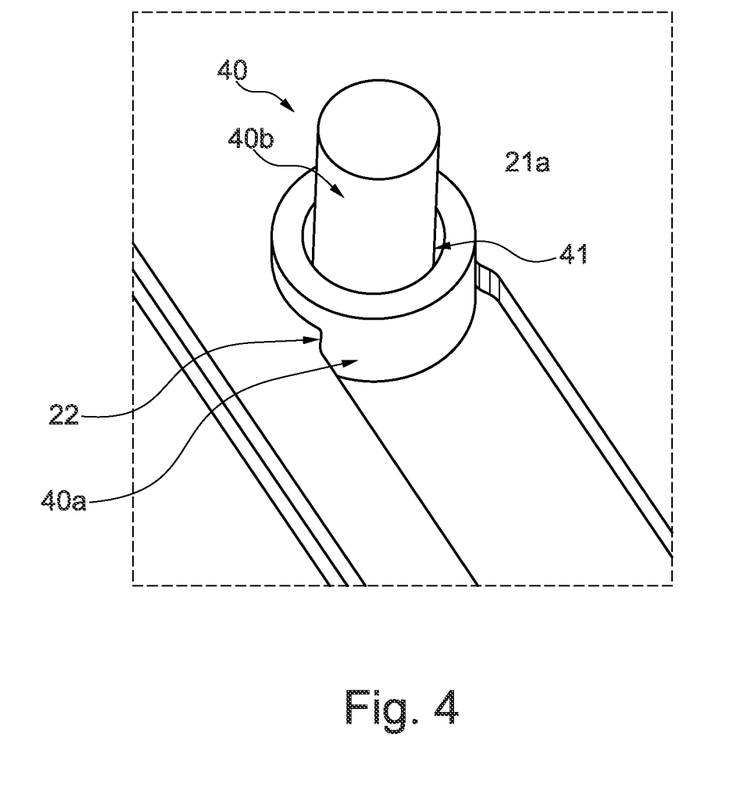
FIG. 4 illustrates a detailed view of a deformable element of a latch assembly.

FIG. 4 illustrates a detailed view of a deformable element 40 of a latch assembly. The deformable element 40 may include an annular part 40a and a middle part 40b. As illustrated, the annular part 40a and the middle part 40b may further include a predetermined spacing 41 therebetween. The deformable element 40 may be located at the first end 21a of the securing slot 21 (shown in e.g. FIG. 3a) and the securing slot 21 may include protrusions 22 to reliably secure the deformable element in the securing slot 21. As illustrated, the protrusions 22 may be located at the first end 21a of the securing slot 21, but the protrusions 22 may be located at any part of the securing slot 21 a person skilled in the art would see fit.

Figure 5A:
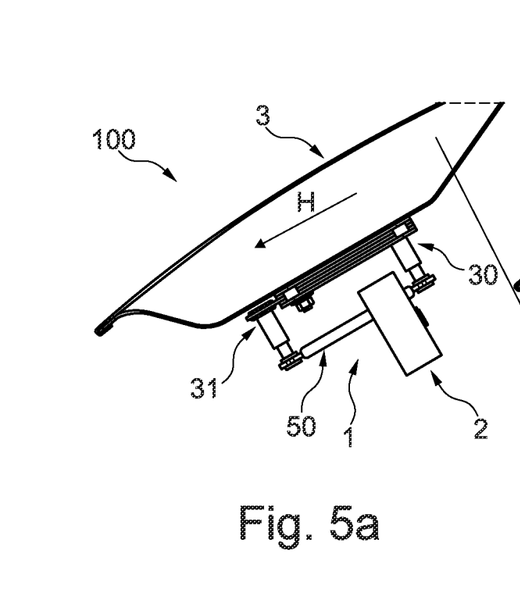
FIG. 5a illustrates a hood elevation system before actuation of the actuator.

FIG. 5a illustrates a hood elevation system 100 before actuation of the actuator, in other words during normal driving conditions. As illustrated, the horizontal direction H and vertical direction V are not implied to be the same as a horizontal and vertical extension of a vehicle itself. These directions should always be interpreted in relation to the latch assembly. As such, the horizontal direction H is the direction in which the sliding movements of the hood elevation system 100 and the latch assembly 1 occur and the vertical direction V is the extension direction of the first member 30. As illustrated, the latch assembly 1 is in its retracted position, meaning any relative movements between the first plate 10 and the second plate 20 are prevented by the at least one deformable element 40. Upon actuation of the actuator, the latch assembly 1 begins to move relative to the hood latch 2 in the horizontal direction H. This movement may be facilitated by a rod 50, which may be slidably connected to the hood latch 2.

Figure 5B:
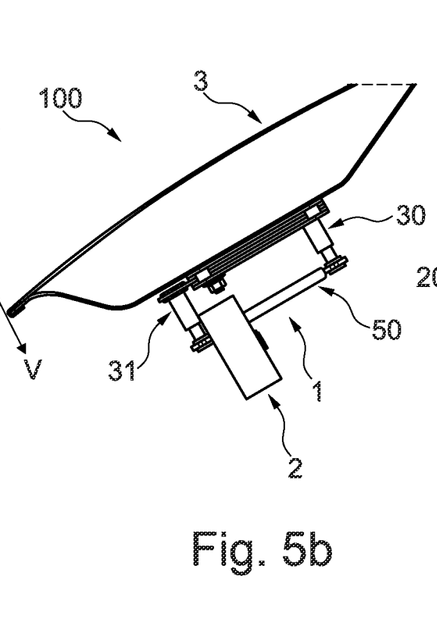
FIG. 5b illustrates a hood elevation system after actuation of the actuator and the latch assembly having reached the stop position.

FIG. 5b illustrates the hood elevation system 100 after actuation of the actuator and the latch assembly 1 having reached a stop position. In this position, there is no more space for the latch assembly 1 to move relative to the hood latch 2. Therefore, the latch assembly 1 collides with the hood latch 2, which deforms the deformable element 40 (shown in e.g. FIG. 1). As shown in FIG. 5b, the stop position is reached upon horizontal impact of the second member 31 and the hood latch 2, thereby the second member 31, hinders further linear movement of the latch assembly 1 relative to the hood latch 2. It should be noted that in some aspects of the present disclosure, the second member 31 may be interchanged with any other suitable means for preventing movement of the latch assembly 1 relative to the hood latch 2 subsequent to a linear movement. After the latch assembly has reached the stop position as shown in FIG. 5b, the resulting horizontal impact allows for deformation of the deformable element 40.

Figure 5C:
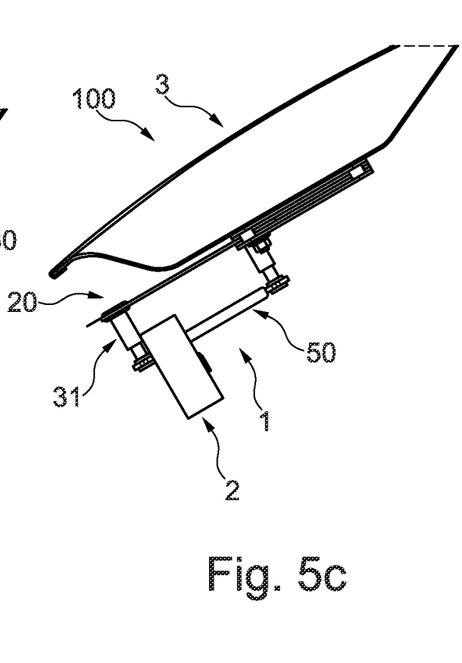
FIG. 5c illustrates a hood elevation system and the latch assembly in its extended position.

FIG. 5c illustrates the hood elevation system 100 and the latch assembly 1 in its extended position. This state occurs after deformation of the deformable element 40. As the first plate 10 is now allowed to move relative to the second plate 20, the extended position is reached as shown in FIG. 5c, allowing the hood to be deployed.

Other variations to the disclosed examples can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A latch assembly for a hood of a vehicle, the latch assembly comprising:
    a first plate comprising an elongated slot extending in a horizontal direction (H);
    a second plate;
    a first member being mechanically connected to the second plate, the first member extending in a vertical direction (V) through the elongated slot, slidably connecting the first plate to the second plate; and
    at least one deformable element, in a retracted position of the latch assembly, securing the first plate to the second plate in the horizontal direction (H);
    the at least one deformable element being arranged to deform upon impact in the horizontal direction (H) allowing the first plate to slide relative to the second plate in the horizontal direction (H) to an extended position.

2. The latch assembly according to claim 1, further comprising:
    a second member being mechanically connected to the second plate, the first member being located at a first portion of the second plate and the second member extending in a vertical direction (V) and being located at a second portion of the second plate; and
    a rod extending in the horizontal direction (H) from the first member (to the second member and the rod being slidably connectable to a hood latch of the vehicle.

3. The latch assembly according to claim 2, wherein in the retracted position, the first member extends through a first region of the elongated slot and in the extended position, the first member extends through a second region of the elongated slot.

4. The latch assembly according to claim 2, wherein the first member and second member comprise adjustment screws configured to adjust the position of the rod in the vertical (V) direction relative to the second plate.

5. The latch assembly according to claim 1, wherein the first plate is parallel to the second plate.

6. The latch assembly according to claim 1, wherein the second plate comprises at least one securing slot, the at least one deformable element being located in the at least one securing slot.

7. The latch assembly according to claim 6, wherein the at least one securing slot comprises protrusions configured to, in the retracted position, lock the at least one deformable element in the horizontal direction (H).

8. The latch assembly according to claim 7, wherein the protrusions are located at a first end of the at least one securing slot.

9. The latch assembly according to claim 1, further comprising a friction decreasing unit.

10. The latch assembly according to claim 1, wherein the at least one deformable element comprises a plastic bushing.

11. The latch assembly according to claim 10, wherein the at least one deformable element comprises an annular part and a middle part, the middle part being attached to the annular part, the annular part and the middle part having a predetermined spacing therebetween.

12. A hood elevation system for a vehicle, the hood elevation system comprising:
   a hood latch;
   a latch assembly slidably connected to the hood latch, the latch assembly comprising:
      a first plate comprising an elongated slot extending in a horizontal direction (H);
      a second plate;
      a first member being mechanically connected to the second plate, the first member extending in a vertical direction (V) through the elongated slot, slidably connecting the first plate to the second plate; and
      at least one deformable element, in a retracted position of the latch assembly, securing the first plate to the second plate in the horizontal direction (H);
      the at least one deformable element being arranged to deform upon impact in the horizontal direction (H) allowing the first plate to slide relative to the second plate in the horizontal direction (H) to an extended position; and
   an actuator configured to move the latch assembly relative to the hood latch upon a collision of the vehicle with a vulnerable road user;
   upon actuation of the actuator, the latch assembly linearly moves in its retracted position away from the hood latch; and
   the at least one deformable element of the latch assembly being arranged to deform upon the latch assembly reaching a stop position in which the latch assembly is prevented from further linear movement away from the hood latch, allowing the first plate to slide relative to a second plate of the latch assembly in the horizontal direction (H) to an extended position.

13. The hood elevation system according to claim 12, wherein the latch assembly further comprises:
   a second member being mechanically connected to the second plate, the first member being located at a first portion of the second plate and the second member extending in a vertical direction (V) and being located at a second portion of the second plate; and
   a rod extending in the horizontal direction (H) from the first member to the second member and the rod being slidably connectable to the hood latch of the vehicle;
   the rod (being slidably connected to the hood latch; and
   the stop position being reached upon horizontal impact of the second member and the hood latch.

14. A vehicle comprising the hood elevation system according to claim 12.

15. A method for manufacturing a latch assembly for a hood of a vehicle, the method comprising:
   providing a first plate comprising an elongated slot extending in a horizontal direction (H);
   providing a second plate;
   mechanically connecting a first member to the second plate, the first member extending in a vertical direction (V) through the elongated slot;
   slidably connecting the first plate to the second plate; and
   providing at least one deformable element arranged to secure the first plate to the second plate in the horizontal direction (H), the at least one deformable element being arranged to deform upon impact in the horizontal direction (H).

* * * * *